May 12, 1959

C. M. STREETE 2,886,129

COMBINED GAS FILTERS AND SILENCERS

Filed May 15, 1956

Charles Mathias Streete
INVENTOR
BY *Silverman + Mullin*
ATTORNEYS

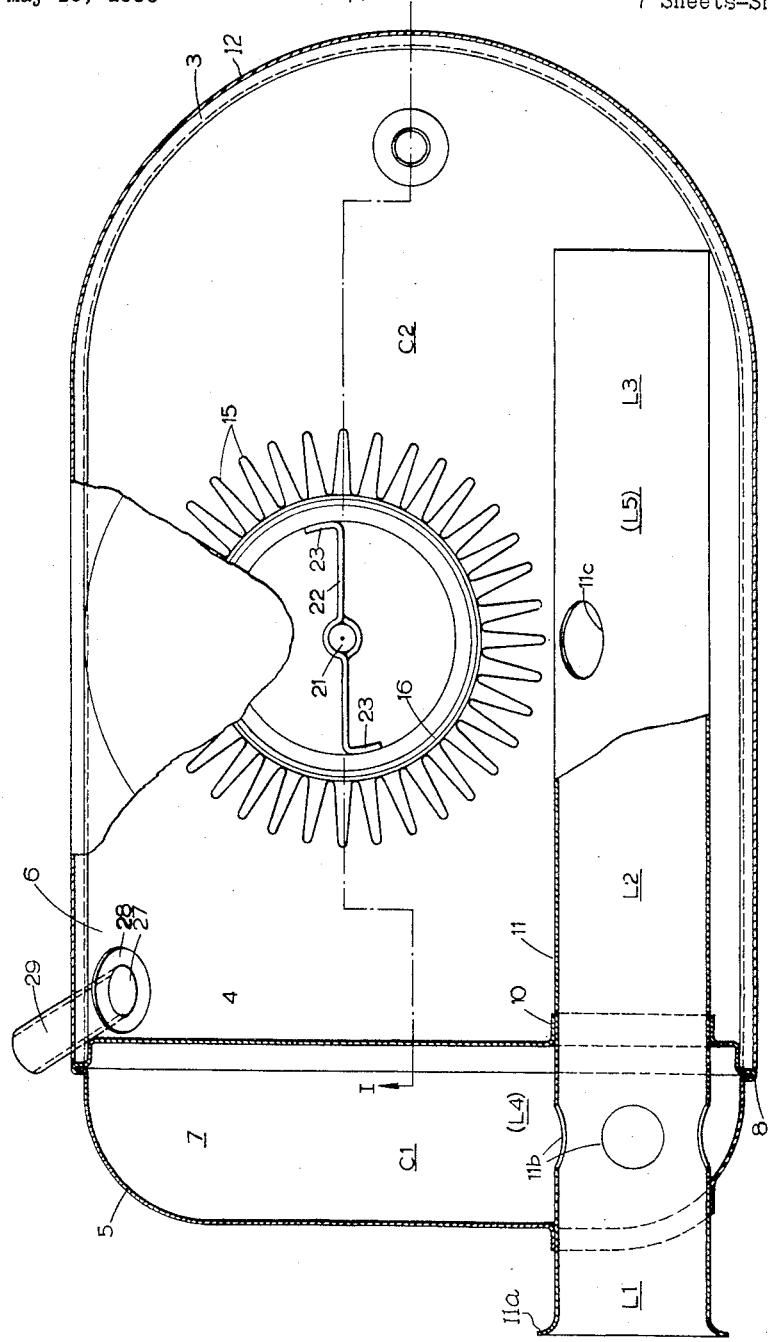

May 12, 1959    C. M. STREETE    2,886,129
COMBINED GAS FILTERS AND SILENCERS
Filed May 15, 1956    7 Sheets-Sheet 3

Charles Mathias Streete
INVENTOR
BY Silverman + Mullin
ATTORNEYS

May 12, 1959 — C. M. STREETE — 2,886,129
COMBINED GAS FILTERS AND SILENCERS
Filed May 15, 1956 — 7 Sheets-Sheet 4

Charles Mathias Streete
INVENTOR
BY Silverman + Mullin
ATTORNEYS

May 12, 1959  C. M. STREETE  2,886,129
COMBINED GAS FILTERS AND SILENCERS
Filed May 15, 1956  7 Sheets-Sheet 5

Charles Mathias Streete
INVENTOR
BY Silverman + Mullin
ATTORNEYS

May 12, 1959  C. M. STREETE  2,886,129
COMBINED GAS FILTERS AND SILENCERS
Filed May 15, 1956  7 Sheets-Sheet 6

Charles Mathias Streete
INVENTOR
BY Silverman + Mullin
ATTORNEYS

May 12, 1959 C. M. STREETE 2,886,129
COMBINED GAS FILTERS AND SILENCERS
Filed May 15, 1956 7 Sheets-Sheet 7
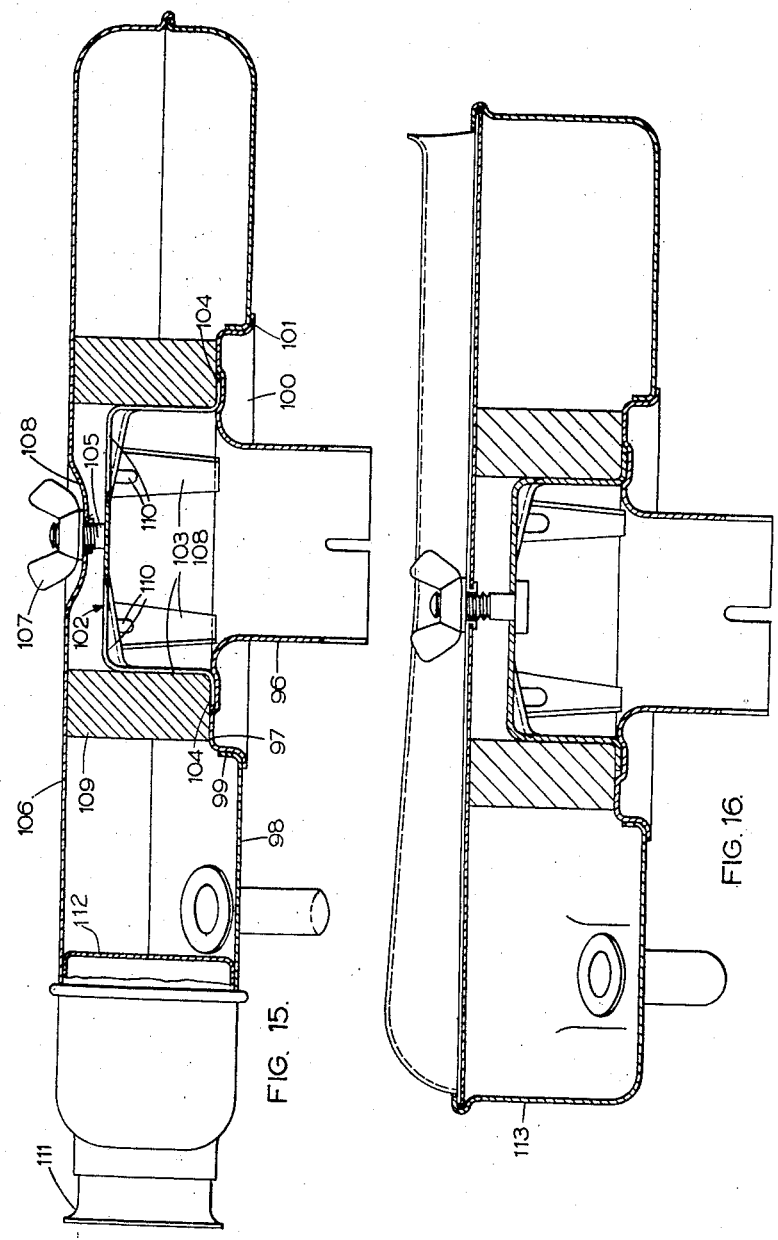
Charles Mathias Streete
INVENTOR
BY Silverman + Mullin
ATTORNEYS

United States Patent Office 2,886,129
Patented May 12, 1959

2,886,129
COMBINED GAS FILTERS AND SILENCERS

Charles M. Streete, Abergavenny, England, assignor to Coopers Mechanical Joints Limited, Abergavenny, England Application May 15, 1956, Serial No. 585,016

Claims priority, application Great Britain May 26, 1955

15 Claims. (Cl. 183—44)

This invention relates to combined gas filters and silencers and is particularly concerned with the cleaning and silencing of the air entering the intakes of internal combustion engines.

A primary object of the present invention is to provide forms of combined air filters and silencers that are particularly suitable for use in motor cars having petrol or diesel engines mounted with very little space between the carburettor or air inlet and the underside of the bonnet or the adjacent side valence, and which, moreover, are particularly cheap to manufacture but efficient in action. The invention is also applicable to marine engines, stationary engines and so forth.

The aforesaid object is achieved, according to the invention, by furnishing a combined gas filter and silencer with a flat casing providing a cavity, an inlet duct extending along said cavity substantially from one edge face thereof to a point close to an opposite edge face thereof and arranged to receive gas at one end and deliver it into the cavity at the other end, an outlet arranged to discharge gas through one of the larger faces of the casing, and filter means in the casing, for filtering the gas prior to passing through the outlet.

The filter means may be constituted by a tubular filter element having its axis at right angles to the axis of the duct and arranged so that the gas discharged from the duct circulates about the filter element and passes through the walls of the filter element to be discharged through the outlet.

To improve the silencing qualities of the device, the duct may be arranged at a point intermediate its ends, to communicate with a blind cavity separate from the first-mentioned cavity. Then a very simple structure accommodating the two cavities may consist of a flattened hollow casing provided with a partition fairly close to one end which separates the two cavities, the duct being constituted by a pipe which enters the casing at the said end and passes through the blind cavity into the first-mentioned cavity and which is formed with at least one hole in that part of its length that lies in the blind cavity. The pipe may then be a straight pipe that extends to a point fairly close to the opposite end of the casing. The pipe may be open at the said point and also formed with at least one lateral anti-resonance hole communicating with the interior of the cavity containing the filter element. Advantageously the end of the casing remote from the blind cavity presents a curved surface to the gas stream emerging from the pipe so as to direct the stream from one side of the cavity to the other side thereof, about the filter element.

In an alternative arrangement, the inlet duct extends along the outside of the casing and has a semi-circular or like cross-section such that it lies snugly against one of the larger faces of the casing, and, where the latter is rectangular, the inlet duct extends along the longer dimension thereof.

According to a very important feature of the invention, there may be two substantially parallel and similar inlet ducts extending from edge face to edge face of the casing. With most forms of filter means, a more efficient distribution of gas thereto may be achieved by arranging the two inlet ducts to extend respectively from opposite edges of the casing so as to discharge into the casing close to opposite edges thereof. In order to obtain a satisfactory pressure distribution through the system, each duct may be formed so as to expand to the area of the port through which the gas is delivered into the casing.

The filter means may take a variety of forms. For example, it may be a tubular filter as aforesaid or it may be an oil bath filter or it may be a membrane, of zig-zag section, extending across the casing parallel to the larger faces thereof.

In order that the invention may be clearly understood some constructions in accordance therewith will now be described in some detail, by way of example, with reference to the accompanying drawings, in which:

Figure 2 is a sectional plan of the combined filter and silencer of Figure 1;

Figure 15 is a part sectional elevation of another modification of the construction of Figure 1, and Figure 16 is a vertical section through a sixth intake filter silencer.

Figure 1:
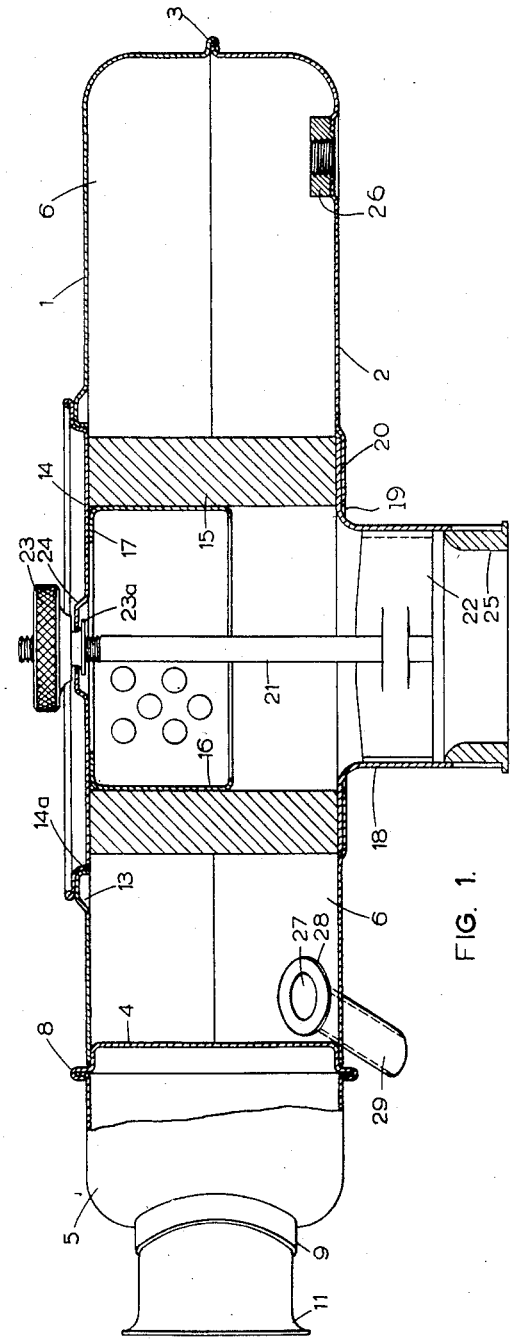
Figure 1 is a sectional side elevation of a combined gas filter and silencer.

Referring first to Figs. 1 and 2, the body of this unit consists of four main parts, namely upper and lower sheet metal pressings 1, 2 clinched together along a horizontal beading 3, a sheet metal partition 4 and a sheet metal pressing 5. The partition 4 closes the left hand end (as viewed in Figures 1 and 2) of the cavity 6 within the pressings 1 and 2, and divides it from a blind cavity 7 within the pressing 5, the latter together with the partition 4 being clinched to the pressings 1, 2 along a vertical beading 8.

On one side of the unit, the pressing 5 and the partition 4 are formed with flanged apertures 9, 10 through which a straight metal pipe 11 is inserted, the pipe 11 being spot welded to the flanges.

The pipe 11 has a slightly flared inlet end 11a and, within the blind cavity 7, is formed with four holes 11b respectively at the top, bottom, and sides of the pipe. The discharge end of the pipe 11 lies close to the opposite end 12 of the cavity 6. Half-way along the length of the pipe 11 that lies in the cavity 6, the pipe 11 is formed with an anti-resonance hole 11c having its centre on a radius inclined at 45° of arc.

The top wall of the cavity 6, i.e. the pressing 1, is formed with a large aperture embossed around its edge to provide a strengthening ring 13 for supporting a flange 14a on a cover plate 14. The cylindrical portion of the flange 14a is a gas-tight fit inside the ring 13. A cylindrical filter element having a corrugated or pleated wall, consisting of oil wetted knitted galvanised wire mesh 15, is secured to the underside of the cover plate 14, the filter element being connected by staples to a perforated cylinder 16 formed with a flange 17 spot welded to the cover plate 14. While the cylinder 16 is of such a length that it only extends part of the way down towards the bottom of the cavity 6, the filter element 15 is of such a length that its lower end is pressed tightly against the bottom of the cavity when the cover plate 14 is fixed in position.

The outlet from the unit is provided by an outlet pipe 18 registering with an aperture 19 in the bottom wall of the cavity 6, the aperture 19 being within the wire mesh filter wall 15. The outlet pipe 18 is formed with a flange 20 spot welded inside a slightly depressed portion of the pressing 2 surrounding the aperture 19.

A tie rod 21, co-axial with the outlet pipe 18 and with the filter element 15, is spot welded to a transverse plate 22 having flanges 23 spot welded to the interior of the outlet pipe 18, the lower end of the tie rod passing through a loop formed at the centre of the plate 22. The top of the tie rod 21 is screw threaded to receive a knurled nut 23 which is screwed down to bear on an embossed edge 24 of a hole at the centre of the cover plate 14. The latter is thereby clamped firmly in position. It will be observed that the nut 23 is formed with a flange 23a that retains it on the cover plate 14.

The lower end of the outlet pipe 18 is split so as to enable it to be clamped onto the upper end of a carburettor down tube iwth an intervening rubber bush 25 provided to insulate the silencer from mechanical vibrations transmitted from the engine by way of the carburettor. The device is further supported by a member (not shown) bolted to a bush 26 in the pressing 2. The latter is formed with a further opening at 27 around which a flange 28 on a nipple 29 is spot welded. The nipple 29 is connected by flexible tubing (not shown) to the breather hole of the crankcase or rocker cover or both of the engine so that the silencer serves also to consume fumes emanating from the crankcase or the rocker cover or both.

In operation, the pulsating suction applied by the engine to the outlet pipe 18 induces air to flow through the pipe 11 into the cavity 6. It will be observed that the end 12 of the cavity 6 is arcuate so that the air sweeps round this surface to the opposite side of the cavity while any heavier impurities are thrown out of the stream by centrifugal action and deposited inside the cavity. The air circulates around the filter element 15, some of the air only circulating through a small arc before passing through the filtering material while other portions of the air travel much further before being filtered.

The silencing is effected by both cavities 6, 7 and by the pipe 11 and, in this connection, the arrangement may be regarded as analogous to an electrical filter circuit for eliminating unwanted frequencies. Thus the pipe 11 may be looked upon as providing three inductors L1, L2, L3 in series and the holes 11b, 11c as providing two inductors L4, L5 in parallel leading respectively to two earthed capacitors C1, C2 constituted by the cavities 6, 7.

Figure 3:
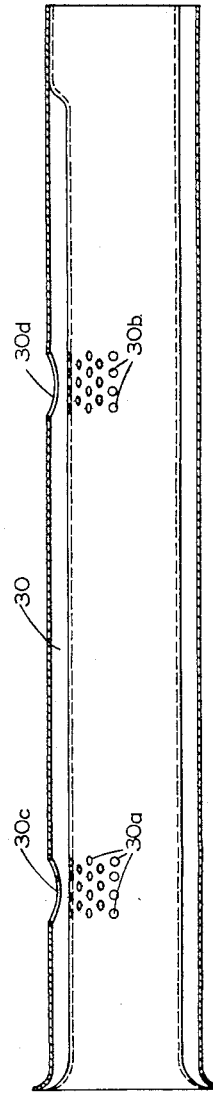
Figure 3 is a sectional plan showing a modification of part of the construction of Figures 1 and 2.

If desired the pipe 11 may have a double wall (as shown in Figure 3) so that it is surrounded by an annular space 30 closed adjacent the inlet end of the pipe but open at the other end. In this arrangement the holes 11b, 11c are replaced in the inner part of the wall by two groups 30a, 30b of small perforations respectively located at the same distances along the pipe as the holes 11b, 11c. These perforations lead into the annular space 30 and are opposite respectively two holes 30c, 30d in the outer part of the double wall, these holes being about the same size as the holes 11b, 11c and leading respectively into the cavities 6, 7 on the side of the pipe adjacent the larger portions of the cavities. The two holes 30c, 30d may be regarded as inductors similar to the two inductors L4, L5 while the groups of perforations may be regarded as resistors respectively in series with these inductors. The annular space serves as a rectifier having the effect of preventing return flow through the two holes from the cavity 6 to the cavity 7.

In a further alternative construction the air is discharged through the cover plate and the opposite wall of the cavity 6 is closed.

Figure 4:
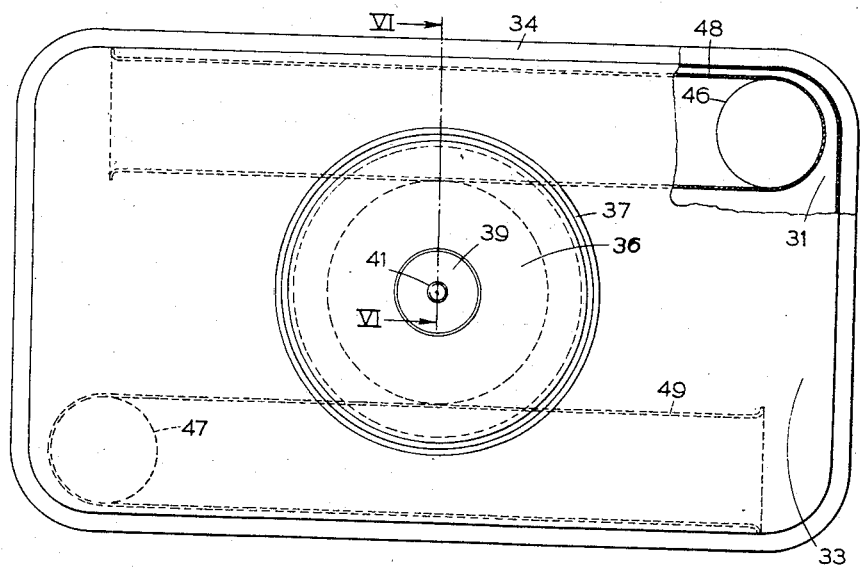
Figure 4 is a plan, partly in section of a second combined filter and silencer for an internal combustion engine.
Figure 5:
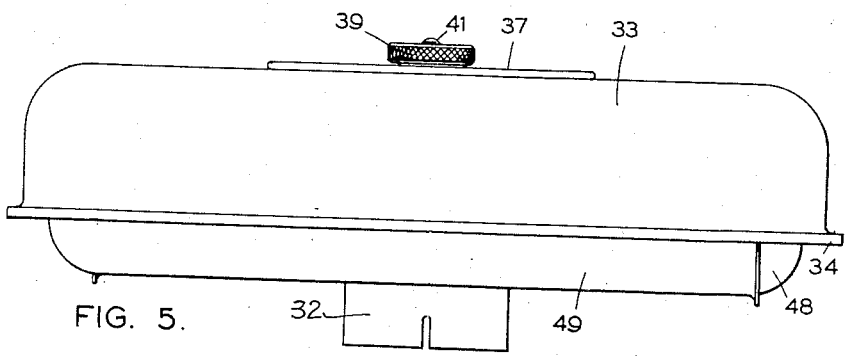
Figure 5 is a side elevation of the silencer of Figure 4.
Figure 6:
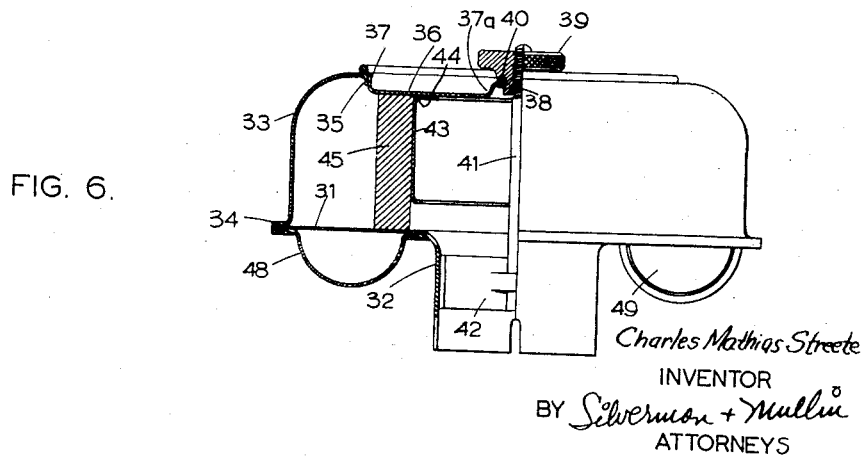
Figure 6 is a part sectional end elevation of the silencer of Figures 4 and 5, the section being taken on the line VI—VI in Figure 4.

Referring to the construction of Figures 4 to 6 it will be seen that this comprises a flat base plate 31 formed at its centre with a perpendicular outlet 32 to be fitted onto the inlet to a downdraught carburettor. The plate 31 is secured to the bottom of a one-piece casing member 33 by means of beading 34. The top of the casing member 33 is formed centrally with an aperture surrounded by an inturned flange 35. A dished cover 36 is formed with a peripheral flange 37 that fits inside the flange 35 and overlaps the top thereof. The centre of the cover 36 is formed with an embossed part 37a and this part is formed with a central hole through which projects a sleeve 38 on a knurled nut 39. The lower end of the sleeve 38 is flared outwards so that the edge of the hole is held between the flared part and shoulder on the nut 39, with intervening washers 40 which, however, permit the nut 39 to turn relatively to the cover 36. The cover 36 is secured to the casing member 33 by screwing the nut 39 down a threaded upper end of a rod 41 welded into a loop formed on a plate 42 extending diametrically across the outlet duct 32 and welded thereto.

A sleeve 43, that is preferably perforate, is formed at its upper edge with a flange 44 welded to the cover 36. A cylindrical mass of oil wetted knitted galvanised wire mesh 45 is fitted round the sleeve 43. It will be observed that while the sleeve 43 does not extend downwards as far as the plate 31 the length of the cylindrical wire mesh is such that it is pressed firmly against the plate 31 by the cover 36.

The entry to the casing takes place through ports 46, 47 at opposite corners of the plate 31. The air is led to the ports 46, 47 through semi-cylindrical ducts 48, 49 parallel to one another and extending along the longer dimension of the plate 31 on opposite sides of the outlet duct 32. The tops of the semi-cylindrical ducts 48, 49 are closed by the plate 31 and their inlet ends are slightly flared. Their outlet ends are closed by quadrants of spheres that fit round the ports 46, 47. The edges of the ducts 48, 49 are flanged and welded to the plate 31.

In operation, the air is drawn along the ducts 48, 49 to the ports 46, 47 where the streams turn through a right angle and enter the space within the casing but outside the cylindrical filtering mass 45. The fact that the ports 46, 47 are at opposite corners of the casing ensures a homogeneous distribution about the cylindrical filtering mass 45. To clean the latter it is merely necessary to remove the cover 36 to which the filtering mass 45 is attached.

The silencing is effected by the inlet ducts 48, 49 and by the space within the casing surrounding the wire mesh. This silencing arrangement may be regarded as analogous to an electric circuit in which the said space is an earthed capacitor fed through parallel inductors constituted by the inlet ducts 48, 49. One or more fairly small holes may be formed in each duct 48, 49 to provide the analogy of further inductors leading to the capacitor and dividing each duct into two or more inductors in series.

Figure 7:
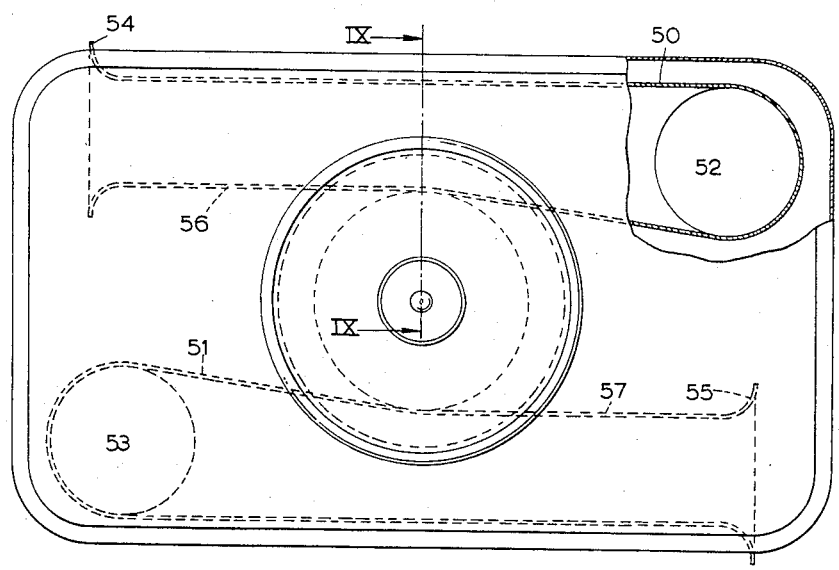
Figure 7 is a plan, partly in section, of a third intake filter silencer.
Figure 8:
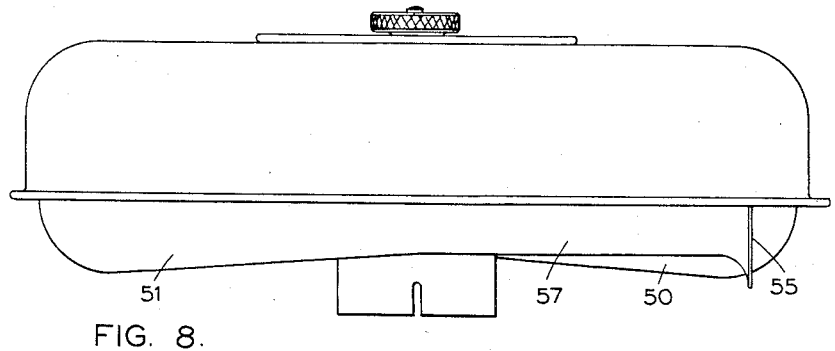
Figure 8 is a side elevation of the silencer of Figure 7.
Figure 9:
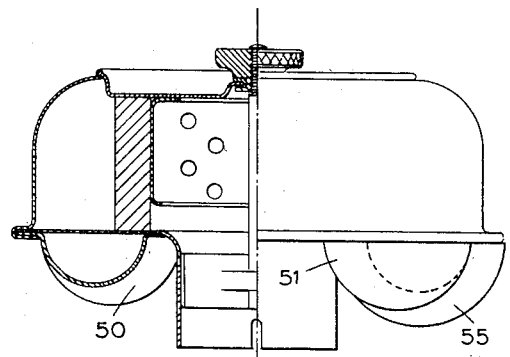
Figure 9 is a part sectional end elevation of the silencer of Figures 7 and 8, the section being taken on the line IX—IX in Figure 7.

The construction of Figures 7 to 9 is similar to that of Figures 4 to 6 except for the shape of the inlet ducts and inlet ports, the latter being somewhat larger than in the preceding construction. Again the ducts are semi-circular in cross-section but they have portions 50, 51 of expanding cross-section leading to the inlet ports 52, 53. The inlets 54, 55 of the ducts are more widely flared than in Figures 4 to 6 and these converge to parallel portions 56, 57 leading to the narrower ends of the expanding portions 50, 51.

Figure 10:
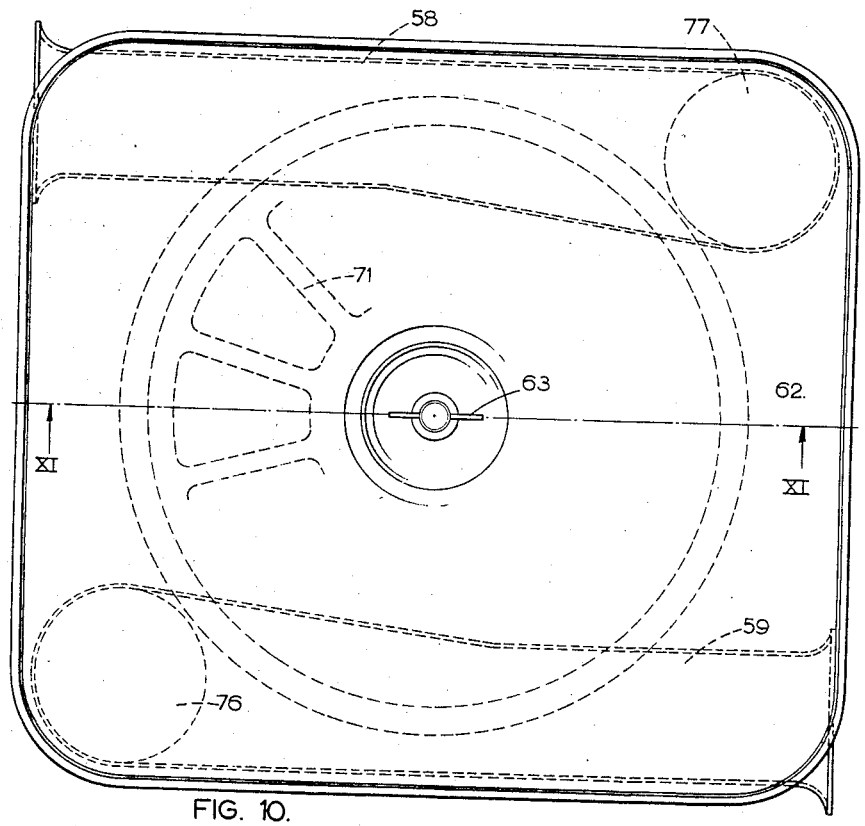
Figure 10 is a plan of a fourth intake filter silencer.
Figure 11:
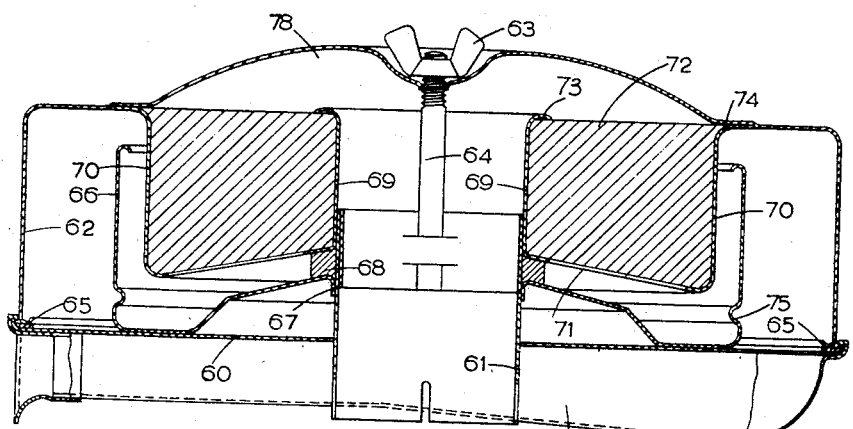
Figure 11 is a section on the line XI—XI in Figure 10 showing also certain portions broken away.

In the construction of Figures 10 and 11 the general shape of the inlet ducts 58, 59 is the same as in Figures 7 to 9 but the filtering arrangement above the plate 60 is different. It will be observed also that the outlet duct 61 is not integral with the plate 60 but passes through a central aperture therein, also that the casing member 62 and cover are integral with one another and held in position by the nut 63 screwed to the rod 64, the lower edge of the casing member 62 being inturned and bearing on a gasket 65 within a flanged edge of the plate 60.

The filter comprises an oil bath 66 welded to the plate 60 and formed with a flanged aperture 67 in which the duct 61 is welded. Above the flanged aperture 67, the duct 61 is surrounded by a washer 68 on which rests a unit comprising inner and outer cylinders 69, 70 joined by radii 71 and containing a mass 72 of woven or knitted wire. The upper edge of the cylinder 69 is flanged at 73 to retain the mass 72 and the upper edge of the cylinder 70 is flanged at 74 to bear against the casing member 62, with, if desired, an interposed washer.

In operation, the oil bath 66 is filled with oil to a level somewhat above the level of an embossed ridge 75 in its wall. The air enters the casing through the ports 76, 77 and flows over the top edge of the oil bath 66. It then flows downwards outside the cylinder 70 and then turns upwards over the oil to flow upwards through the mass 72 of wire mesh. On reaching the top of the latter, the air converges in a space 78 thereabove to the interior of the cylinder 69 down which it flows to be discharged through the duct 61. As the air turns upwards over the oil, impurities are deposited therein and as the air travels upwards through the mass 72 of filtering material, further impurities are extracted thereby. Some oil is carried upwards into the mass 72 and serves to wash the latter.

Figure 12:
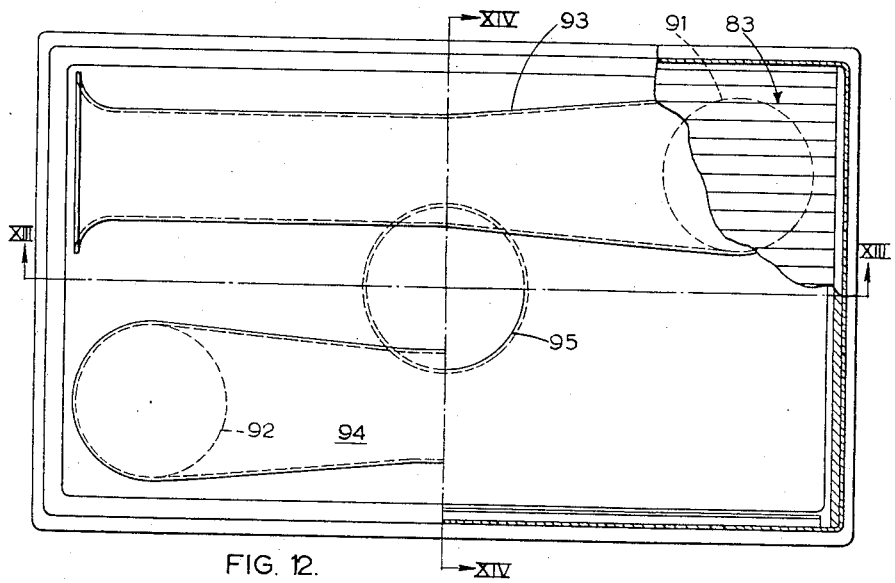
Figure 12 is a plan of a fifth intake filter silencer.
Figure 13:
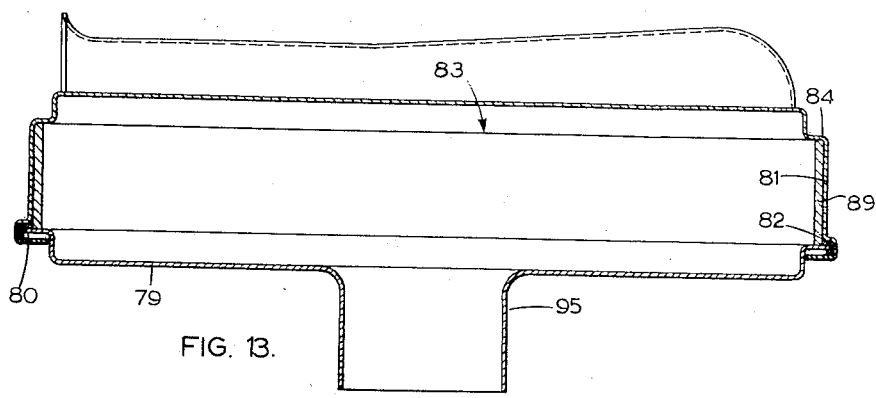
Figure 13 is a section on the line XIII—XIII in Figure 12.
Figure 14:
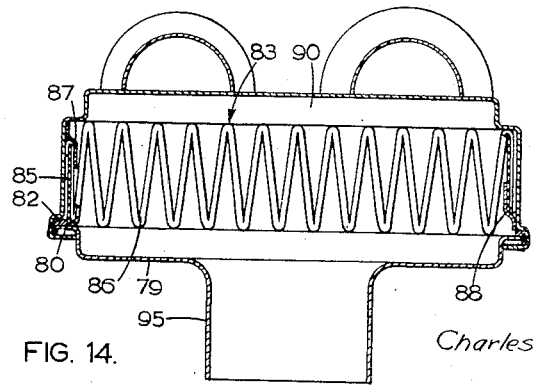
Figure 14 is a section on the line XIV—XIV in Figure 12.

In the construction of Figures 12 to 14, the casing is substantially rectangular in plan and the base plate 79 is dished and formed with a peripheral flange 80 against which the lower edge of the casing member 81 is clamped (by means not shown) with an intervening gasket 82. The top corner of the casing member 81 is re-entrant around its entire periphery so as to enable a filter element 83 to be clamped round its four sides between a flange 84 and the flange 80. The filter element consists of a zig-zag layer of wire gauze 85 over which is provided a layer of felt 86, one thirty-second of an inch thick, bound round the edge of the gauze. The straight edges of the filter element are tucked under clips 87, 88 welded to the casing member 81. A one eighth inch felt seal 89 may be interposed between each of the zig-zag edges of the filter member and the adjacent casing wall.

The aforesaid re-entrant corner of the casing member 81 provides a space 90 above the filter element and the air passes into this space through ports 91, 92 at opposite corners thereof. The air is led to these ports respectively through inlet ducts 93, 94 similar to the inlet ducts appearing in Figures 7 and 10, except that the nature of the structure permits the parallel and expanding portions of each duct to be coaxial. After passing through the filter element the air enters the dished base plate 79 to be discharged through the outlet duct 95.

Figure 15 shows a modification of the construction of Figures 1 and 2 in which the outlet pipe 96 forms part of a cover plate 97 that closes a large aperture in the bottom wall 98 of the casing. This aperture is formed with a peripheral inturned flange 99 and the cover plate 97 is formed with a downturned flange 100 that fits inside this flange 99, the flange 100 being formed with a peripheral rim 101 that prevents the cover plate 97 from being forced too far into the casing. A spider 102 having the outer portions of its limbs 103 turned vertically downwards is welded to the cover plate 97, the tips 104 of the downturned portions being bent outwards to enable this to be done. Secured centrally to the spider 102 is a threaded tie rod 105 which passes upwards through a small aperture in the top wall 106 of the casing, a wing nut 107 being screwed onto the tie rod 105 to bear down on a dished part 108 of the top wall 106. The pleated cylindrical filter element 109 which presses against the top wall 106 of the casing when the cover is in position, is secured to the vertical parts of the spider. The limbs of the spider are strengthened by inwardly pressed webs 110.

The construction of Figure 16 can be regarded as a modification of Figure 15, in which the partition 112 closing off the blind cavity is omitted and in which the inlet pipe 111 is replaced by two inlet ducts at the top which are precisely similar to those in the construction of Figures 12 to 14. Another difference is that the casing 113 is rectangular in plan.

Where the inlet ducts are of expanding cross-section, as in Figures 7 to 9, an advantage is obtained in that a small air entry, providing good silencing conditions, is obtained in conjunction with a reasonably low pressure drop across the filter. Where a flared mouth-piece is employed at the entry of the duct, this reduces the energy loss at the mouth of the duct, whilst the expanding portion enables up to 80% of the energy lost in the narrower portion to be recovered. Acoustically the sound waves are moving in the opposite direction to the incoming air and the resistance offered by the portion that is contracting towards the end at which the air enters the duct considerably reduces the energy of the sound waves, which is further attenuated in the narrowest portion of the duct. Further, the said contracting portion tends to reflect the sound back towards the body of the silencer, its energy ultimately being absorbed or exhausted. An inlet duct of this kind enables the provision of a secondary or blind cavity, such as the cavity 7 in Figures 1 to 3, to be eliminated. With an internal inlet duct having parallel walls, such secondary cavity is highly desirable.

In the construction of Figures 12 to 14, the filter element may be replaced by a zig-zag unit of paper filtering material. If this is synthetic resin bonded, it does not require additional support. Where, as in Figures 1 and 2, a cylindrical pleated filter element is employed, this also may be made of paper.

I claim:

1. A combined gas filter and silencer comprising, in combination, walls defining a casing, an inlet pipe of expanding cross-section extending along said casing from a point close to one end thereof to a point close to the opposite end thereof and adapted to receive gas at its narrow end and deliver it into the casing at its larger end, said larger end being disposed so as to provide a free flow of gas as the gas enters said casing, means defining an outlet arranged to discharge gas through one of the faces of said casing, and filter means in said casing for filtering the gas prior to passing through said outlet, said inlet pipe being straight substantially the entire length thereof to provide a straight path for gas flow therein until the discharge end thereof is reached.

2. A combined air filter and silencer for internal combustion engines comprising, a relatively flat, hollow casing formed of a pair of parallel planar walls conjoined along their peripheral edges by a circumferential wall of substantially uniform, relatively narrow width, the relative dimensions of said walls being selected so that the casing presents a substantially reduced area in side elevation normal to the circumferential wall as compared with the area of the casing presented in plan view thereof, one of said planar walls having outlet means for gas on the interior of the casing, an elongate duct extending along the casing having an inlet port at one end thereof and a discharge opening at its opposite end into the casing with the length of the duct between said open ends thereof being substantially straight, said duct extending substantially between opposing inner surfaces of said circumferential wall substantially the entire length of the casing and having its axis substantially parallel with said planar walls, filter means on the interior of the casing interposed between said outlet means and discharge opening arranged to filter gas entering the casing prior to efflux thereof from the casing through the outlet means, said discharge opening located relative said circumferential wall such that gas traversing said duct and thereafter discharged into the casing is intercepted by the filter means substantially free of turbulence.

3. A structure as described in claim 2 in which said filter means comprises a tubular filter element mounted with its annular wall surrounding said outlet means, and said duct is disposed entirely within the casing.

4. A structure as described in claim 3 in which said circumferential wall is curved adjacent said discharge opening so that gas discharged into the casing follows around said curved surface, said filter element being located between the ends of the duct and arranged to receive said gas discharged on a side thereof remote from said curved surface.

5. A structure as described in claim 3 in which the second planar wall is formed of two parts comprising a first part formed with an opening and the second part arranged closing said opening, said filter element being attached to said second part and said parts being separable one relative the other.

6. A structure as described in claim 5 in which said tubular element is tightly engaged against the first planar wall when the first part is attached to the second part.

7. A combined gas filter and silencer according to claim 3, in which the one of said planar walls formed with said outlet means comprises two parts, namely a first part formed with an opening into which the second part fits and to which it is detachably secured, the second part being formed with the outlet means and the tubular filter element being fixed to said second part about said outlet means.

8. A structure as described in claim 7 in which said tubular element is of predetermined length to press against said first planar wall.

9. A structure as described in claim 2 in which said duct conforms along one side thereof to the outside surface of a portion of one of said planar walls so as to be intimately engaged therewith.

10. A structure as described in claim 9 in which said planar walls are substantially rectangular in configuration.

11. A structure as described in claim 2 in which there are a pair of said ducts of substantially identical structure and parallel one with the other along opposite sides of said circumferential wall.

12. A combined gas filter and silencer according to claim 11, in which said inlet ducts are adapted respectively to receive gas at opposite ends of but outside said casing and respectively to deliver it into opposite ends of said casing.

13. A combined gas filter and silencer according to claim 11, in which each said inlet duct has an expanding cross-section and inlet and outlet ends oppositely disposed from those of the other inlet duct, the larger end of each duct being disposed to provide a free flow of gas into said casing.

14. A combined gas filter and silencer according to claim 11, in which each said inlet duct has an expanding cross-section and inlet and outlet ends oppositely disposed from those of the other inlet duct, the larger end of each duct being disposed to provide a free flow of gas into said casing, and each duct conforming along one side to the outside of a portion of one of said planar walls so that it is packed snugly against said one planar wall.

15. A combined gas filter and silencer for internal combustion engines comprising, an otherwise closed, substantially flat casing having connecting walls defining a pair of internal cavities consecutively arranged one relative the other, a straight inlet pipe traversing the first cavity and extending to a point close to the remote end of the second cavity, said pipe having an inlet end exterior of the cavities and a discharge end located at said point, said pipe having at least one perforation connecting with the first cavity with said first cavity being otherwise closed, said second cavity having outlet means for air therein, filter means in said second cavity for filtering gas prior to efflux thereof through said outlet means, said inlet pipe being substantially straight between said open ends thereof, and said discharge end being located relative an adjacent wall of the casing to provide for leading of gas discharged therethrough into the second cavity to said filter means substantially free of turbulence.

References Cited in the file of this patent

UNITED STATES PATENTS

| 752,386 | Dunlop et al. | Feb. 16, 1904 |
| 2,259,938 | McLeish | Oct. 21, 1941 |
| 2,393,660 | Sebok | Jan. 29, 1946 |
| 2,553,306 | Dietrich | May 15, 1951 |
| 2,553,326 | Manning | May 15, 1951 |
| 2,705,546 | Chaffey | Apr. 5, 1955 |
| 2,763,251 | Dolza | Sept. 18, 1956 |
| 7,788,086 | Sebok | Apr. 9, 1957 |
| 2,789,662 | McMullen | Apr. 23, 1957 |

FOREIGN PATENTS

| 335,117 | France | Nov. 13, 1903 |
| 1,109,454 | France | Sept. 28, 1955 |
| 734,253 | Germany | Apr. 12, 1943 |